United States Patent Office 2,957,297
Patented Oct. 25, 1960

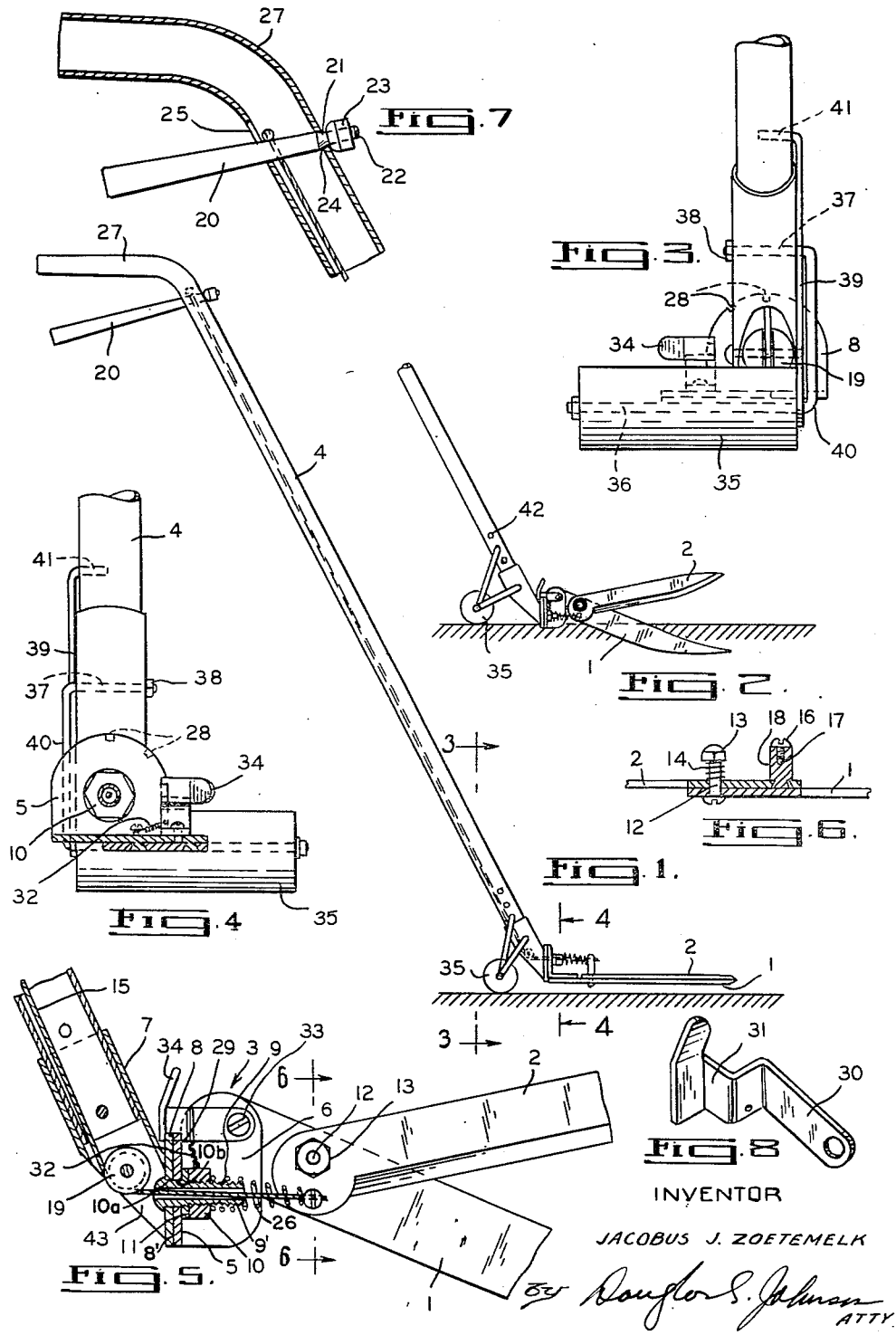

2,957,297

HAND OPERATED GRASS SHEARS

Jacobus J. Zoetemelk, 20 Annette St., Toronto,
Ontario, Canada

Filed Aug. 21, 1958, Ser. No. 756,506

12 Claims. (Cl. 56—240)

This invention relates to grass shears and more particularly to grass shears of the double purpose type shown in my United States Patent 2,777,196, granted January 15, 1957, in which the blades of the shears can be adjusted for use in a horizontal or vertical plane.

It is the object of the present invention to provide adjustable grass shears of the above mentioned type which will be of very simple, sturdy and inexpensive construction and can be operated very easily and efficiently.

Another important object is to provide grass shears as aforesaid which will be capable of cutting close up to walls or other obstructions.

A further important object is to enable the adjustment of the blades from the horizontal to the vertical plane to be very quickly and easily accomplished, and further to enable the blades to be adjusted with equal facility to positions intermediate the vertical and horizontal planes for cutting on an angle.

Still a further object is to enable the adjustment of the blades to be effected without in any way adversely affecting their cutting action whereby the shears can be actuated with equal facility in the plane to which they have been adjusted.

Again it is an important object to afford adequate support for the blades in any plane to which they have been adjusted and further to provide for the steadying of the blades in operation in all planes.

According to one feature of the invention the blades of the shears are carried by a bearing support or bracket supported over a substantial area in a substantially vertical plane at the lower end of a tubular handle to rotate about a substantially horizontal hollow pivot member whereby the blades can be swung between and will be adequately supported in horizontal and vertical planes, and an operator arranged to be actuated from the upper end of the handle extends through the hollow pivot member and is connected to achieve, on operation, a shearing coaction between the blades to effect cutting.

Another important feature of the invention resides in fixing one of the blades rigidly to the bearing bracket while the other blade is pivotally supported to pivot into and out of cutting coaction with the fixed blade, the operator for effecting blade coaction being connected to the pivotal blade.

Still another important feature resides in utilizing the hollow pivot member as a means of clamping the bearing bracket to its supporting surface at the lower end of the handle. In this connection the hollow pivot member is preferably a hollow bolt.

Again it is a feature of the invention to employ as the blade operator a substantially non-extensible flexible member such as a cable or the like and to utilize as the means for operating such flexible member a simple lever which extends through and is fixed outside of the handle enabling the handle to be constituted by a simple tube.

Still a further feature resides in the provision of a simple latch device carried by the bearing plate for locking the bearing bracket in adjusted positions of operation.

Again it is a feature to provide a roller adjustably and springably supported from the handle for guiding and steadying the shears in operation.

These and other objects and features will become apparent from the following detailed description taken in conjunction with the accompanying drawings in which Figure 1 is a side elevational view of grass shears embodying the invention.

Figure 2 is a view similar to Figure 1 but showing the handle broken away and the blades of the shears turned from the horizontal to a vertical plane.

Figure 3 is an enlarged rear elevational view as viewed from the line 3—3 of Figure 1.

Figure 4 is an enlarged transverse sectional view taken on the line 4—4 of Figure 1 with the handle being broken away.

Figure 5 is a fragmentary mid-vertical sectional view taken at the lower end of the handle of the shears.

Figure 6 is a sectional view taken on a reduced scale, on the line 6—6 of Figure 5.

Figure 7 is an enlarged fragmentary vertical mid-sectional view taken through the upper portion of the handle of the shears.

Figure 8 is an enlarged perspective detail of the latch for locking the blades in adjusted planes.

Referring particularly to Figures 1, 2 and 5, according to the invention the shears comprise two coacting blades 1 and 2, carried by a blade support formation generally designated at 3, secured at the lower end of a tubular handle 4, for pivotal movement between a horizontal plane as illustrated in Figure 1 and a vertical plane as illustrated in Figure 2. More particularly, the blade support formation 3 is in the form of a bracket presenting an upstanding part circular section or flange 5 disposed at right angles to the blade-carrying section or portion 6 of the blade support formation 3 and hence, at right angles to the plane of the blades 1 and 2 which have their coacting cutting edges essentially coplanar. The lower end of the handle 4 is telescoped into a fitting 7 which terminates in a part circular flat bearing support formation 8 presenting a planar bearing surface 8. The arrangement of the parts is such that when the handle 4 is disposed in the desired operating position as illustrated in Figure 1, the bearing surface 8' is substantially vertical.

The flange 5 of the blade support 3 is pivotally secured against the bearing surface 8' by means of a bolt 9 having a central bore 9' therethrough, the bolt 9 extending through an opening 10a in bearing support formation 8 and a central opening 10b in flange 5. The centers of the openings 10a and 10b are concentric with the centers of the part circular portions of the bearing support formation 8 and flange 5. Nut 10 is threaded on bolt 9 and engages a spring ring or washer 11 so urging the flange 5 into contact with the surface 8' that the flange 5 is rotatable about the axis of the bolt but is supported over a substantial area around the bolt.

Preferably according to the invention the one blade 1 is rigidly fixed to the blade support 3 and the other blade 2 is pivotally connected to the fixed blade 1 as by means of a bolt 12 and nut 13 as illustrated particularly in Figure 6. The nut 13 acts on a spring 14 to apply spring pressure urging the pivotal blade 2 into engagement with the fixed blade 1.

The pivotal blade 2 is operated by means of a non-extensible flexible element which conveniently comprises a cable 15 secured by means of a clamp screw 16 in a hole 17 formed in a projecting post 18 carried by the blade 2. The cable 15 extends through the hollow bolt 9 into the fitting 7 where it passes over a pulley 19 which conveniently comprises simply a grooved ball. The cable then extends upwardly within the tubular handle 4 to adjacent the upper end thereof where it encircles a lever 20 carried by and extending substantially transversely through the handle as illustrated particularly in Figure 7. The lever 20 is provided with a reduced neck portion 21 which terminates in a threaded extension 22. A nut 23 threaded on the extension 22 defines a locating shoulder to prevent withdrawal of the lever from the handle towards the rear. The opening 24 at the front of the handle is of a size to loosely receive the reduced neck portion 21 of the lever but the lever which preferably is tapered outwardly towards the rear is of a size such that it cannot pass through the opening 24. Thus the nut 23 secures the lever to the handle 4 externally of the handle for rocking or swivel movement.

At the inside, the handle 4 is provided with an elongated slot 25 through which the lever 20 extends and which permits a rocking movement of the lever between the position shown in Figure 7 which corresponds to an open blade position as illustrated in Figure 5 and a closed blade position with the lever 20 swung upwardly to the upper end of the slot 25.

It will be noted from Figure 5 that the pivot bolt 9 extends a substantial distance beyond the clamping nut 13 and sleeved on and guided by this portion of the bolt is a coiled spring 26 encircling the cable 15 and engaging the post 18 carried by the pivotal blade 2. This spring as oriented by the pivot bolt 9 and cable acts through the post 18 eccentrically of the pivot 12 of the blade 2 to urge the blade to the open position of Figure 5. Movement of the blade 2 to the open position acts through the cable 15 to pull the lever 20 down to the lower end of its slot to the position of Figure 7.

Conveniently the tubular handle 4 is turned rearwardly at its upper end to provide a hand grip portion 27 disposed immediately above the lever 20 whereby the operator gripping the portion 27 of the handle can conveniently operate the lever 20, pulling the lever up to effect cutting, and releasing the lever to be returned by the spring 26 after the cut is made.

It will be appreciated that the pivot assembly comprised by the pivot bolt 9 permits the blade support 3 to be rotated to swing the blades from the horizontal position shown in Figure 1 to the vertical position shown in Figures 2 and 5. The periphery of the bearing face 8 of the fitting 7 is provided with a plurality of circumferentially spaced notches 28 and the periphery of the flange 5 is notched as at 29 so that the flange notch can be moved into registration with the bearing face notches 28 as the blade support and hence the plane of the blades is swung to different positions of adjustment between the horizontal position of Figure 1 and the vertical position of Figure 2. A latch 30 as best seen in Figure 8 is pivotally carried by the blade support 3 and this latch is shaped to provide a portion 31 the edge of which is adapted to drop into the registering notches 28 and 29 with the blades swung to a selected plane. A spring 32 acting on the latch 30 to swing it about its pivot 33 maintains the latch in locking engagement in the flange and bearing face notches until released by a pull on the handle 34 provided on the latch.

It will be appreciated that with this simple arrangement that upon release of the latch 30 the blades 1 and 2 can be swung to a selected plane either horizontal or vertical or some intermediate plane according to the pattern of notches 28 and then dropped into the selected registering notches, and regardless of the plane in which the blades are located, the blades will be adequately supported over an appreciable area by virtue of the appreciable area of abutment between the flange 5 of the blade support and the bearing face 8.

Conveniently the shears are provided with a guiding roller 35, the axle 36 of which projects from one end of the roller and is then in U form to provide an arm 37 extending parallel to the axis of the roller 35, and this arm extends through the telescoped lower end of the handle 4 and the fitting 7 to secure these parts in telescoping engagement. Nuts 38 threaded on one end of the axle and on one end of the arm 37 secure the roller to the handle and the handle and fitting in telescoped relation, and it will be appreciated that the roller is free to swing about the arm 37. This arrangement enables the roller to be adjusted relative to the lower end of the handle so as to control the distance of the blades from the ground as illustrated in Figure 1. To set the roller in adjusted positions there is provided an arm 39 of a suitable resilient material such as spring steel, and this arm has one end sleeved on the axle 36 where it is held against the end of the roller by the bend 40 in the axel rod, while the other end of the arm 39 is turned inwardly as at 41 and is adapted to engage in selected holes 42 in the handle 4. It will be understood that the arm 39 may be pulled outwardly to clear the end 41 from the holes 42 and the roller swung in an arc about arm 37 to adjusted position at which time the arm 39 can be released to spring the end 41 into the opposing hole 42.

In use the roller 35 which preferably has an appreciable length affords a guiding and stabilizing means for uniform clipping of the grass and because the blade 1 is fixed, the shears can be utilized to trim close up to walls or other obstructions by running the fixed blade along such obstruction and operating the pivotal blade up to the fixed blade in the cutting action.

To facilitate assembly and servicing the fitting 7 is cut away at the rear as at 43 providing access to the bolt 9, pulley 19 and cable 15.

It will be understood that the shears herein specifically illustrated and described constitute a preferred embodiment of the invention and that it will be obvious to those skilled in the art that various modifications and arrangement of details as well as the specific construction of the parts themselves may be made without departing from the spirit of the invention and scope of the appended claims.

What I claim is:

1. A grass cutting implement comprising a handle member having a bearing, support member at the lower end thereof and a lever handle pivotally mounted adjacent the upper end thereof, a blade support, hollow fastening means rotatably mounting said blade support, upon said bearing, support member, a first blade fixed to said blade support and extending therefrom at an acute angle to a forward direction of operative movement of the implement, a second blade pivotally mounted in cutting relation to said first blade, means biasing said second blade to a position defining an acute angle to said first blade, a non-extensible flexible element fastened at one end to said second blade eccentrically of the pivotal axis thereof extending through said fastening means and fixed to said lever handle and locking means for locking said blade support to said bearing, support member in determined rotational positions.

2. An implement as defined in claim 1 wherein said bearing, support member has a substantially vertical bearing face against which said blade support is rotatable, and a part circular upper edge having a first series of spaced notches therein.

3. An implement as defined in claim 2 wherein said blade support has a substantially vertical portion, one face of which bears against and is laterally supported by said bearing face, said vertical portion having a second series of spaced notches therein corresponding to said first series and said locking means comprising a rotatably mounted latch biased toward locking reception in a notch of both said first and second series.

4. An implement as defined in claim 3 wherein said hollow fastening means comprises a hollow bolt and a clamped nut, said bolt extending through said vertical bearing face and said vertical portion of the blade support, substantially centrally thereof.

5. An implement as defined in claim 1 having a vertically adjustable wheel mounted adjacent the lower end of said inclined handle.

6. A grass cutting implement or the like comprising an elongated inclined tubular handle formation having a generally horizontal pivot formation at its forward lower end, said pivot formation having an axial bore therethrough communicating with the bore of said tubular handle formation, a blade support mounted for rotation on said pivot formation, said blade support carrying a fixed blade member extending forwardly thereof and in offset relation to the axis of pivot of said blade support and extending therefrom at an acute angle to the forward direction of operative movement of the implement, a second blade member pivotally mounted in cutting relation to said fixed blade member, spring means biasing said second blade member to a position defining an acute angle to said fixed blade member, a non extensible flexible linear element fastened at one end to said second blade member eccentrically of the pivot axis thereof, and extending through the axial bore of said pivot formation upwardly through said tubular formation and connected to a control member mounted at the upper end thereof, and locking means for releasably locking said blade support in fixed position relative to said pivot formation.

7. A grass cutting implement comprising an inclined handle member having at its lower end, a support bracket presenting a substantially vertical bearing surface, and having a lever handle pivotally mounted at its upper end, a blade support having a substantially vertical portion presenting a substantially planar surface to the bearing surface of said support bracket, hollow pivot means extending through aligned apertures in said support bracket and the vertical portion of said blade support, said hollow pivot means rotatably mounting said blade support upon said support bracket, a first blade member fixed to said blade support and extending therefrom at an acute angle to the forward direction of operative movement of the implement, a second blade member pivotally mounted in cutting relation to said fixed blade member, spring means biasing said second blade member to a position defining an acute angle to said fixed blade member, a non extensible flexible linear element fastened at one end to said second blade member eccentrically of the pivot axis thereof and extending through said hollow pivot means and fixed to said lever handle and locking means for releasably locking said blade support to said support bracket.

8. An implement according to claim 7 wherein said support bracket has a part circular edge portion having a first series of radially extending circumferentially spaced notches therein, and the vertical portion of said blade support has a part circular edge portion registering with said first mentioned circular edge portion of said support bracket, the part circular edge portion of said blade support having a second series of circumferentially radially extending spaced notches therein corresponding to said first series of notches and said locking means comprises a pivotal latch formation carried by one of said blade supports biased toward locking engagement in aligned notches of said first and second series.

9. An implement as defined in claim 7 wherein said hollow pivot means comprises a hollow bolt and a clamping nut.

10. An implement as defined in claim 7 having a vertically adjustable wheel mounted adjacent the lower end of said inclined handle.

11. A grass cutting implement comprising an inclined handle member having at its lower end, a support bracket presenting a substantially vertical bearing surface, and having a lever handle pivotally mounted at its upper end, a blade support having a substantially vertical portion presenting a substantially planar surface bearing against the vertical planar bearing surface of said support bracket, hollow bolt means extending through aligned apertures in said support bracket and the vertical portion of said blade support, said hollow bolt means rotatably mounting said blade support upon said support bracket and clamping nut means carried by said hollow bolt urging said blade support into engagement with the vertical bearing surface of said support bracket, a first blade member fixed to said blade support and extending therefrom at an acute angle to the forward direction of operative movement of the implement, a second blade member pivotally mounted in cutting relation to said fixed blade member, spring means biasing said second blade member to a position defining an acute angle to said fixed blade member, a non-extensible flexible linear element fastened at one end to said second blade member eccentrically of the pivot axis thereof and extending through said hollow pivot means and fixed to said lever handle, said support bracket having a part circular edge portion with a first series of radially extending circumferentially spaced notches therein and the vertical portion of said blade support having a part circular edge portion registering with said first mentioned circular edge portion and having a second series of radially extending circumferentially spaced notches therein corresponding to the first series of notches and a pivotal latch formation carried by said blade support and biased toward locking engagement in aligned notches of said first and second series.

12. An implement as defined in claim 11 having a vertically adjustable wheel mounted adjacent the lower end of said inclined handle.

References Cited in the file of this patent

UNITED STATES PATENTS

| | | |
|---|---|---|
| 1,222,950 | Heidl | Apr. 17, 1917 |
| 1,869,295 | Atterbury | July 26, 1932 |
| 2,712,721 | Gosparlin | July 12, 1955 |
| 2,777,196 | Zoetemelk | Jan. 15, 1957 |